United States Patent [19]

Vis et al.

[11] 4,420,199

[45] Dec. 13, 1983

[54] CABLE CONNECTOR

[75] Inventors: Arthur D. Vis, Warren; Karl Sarafian, Lathrup Village, both of Mich.

[73] Assignee: Craft Line Inc., Hazel Park, Mich.

[21] Appl. No.: 316,622

[22] Filed: Oct. 30, 1981

[51] Int. Cl.³ ............................................ H01R 39/10
[52] U.S. Cl. .................................... 339/8 R; 339/5 M
[58] Field of Search ........................................ 339/5-8, 339/112 R; 219/86.1, 86.8, 89

[56] References Cited

U.S. PATENT DOCUMENTS

| | | | |
|---|---|---|---|
| 2,790,152 | 4/1957 | Mohr | 339/8 R |
| 3,071,679 | 1/1963 | Fetz | 219/89 |
| 4,210,373 | 7/1980 | McGee | 339/8 R |
| 4,329,559 | 5/1982 | Kishi et al. | 219/89 |
| 4,348,575 | 9/1982 | Hedron et al. | 219/86.1 |

Primary Examiner—Joseph H. McGlynn
Assistant Examiner—David Pirlot
Attorney, Agent, or Firm—Krass, Young & Schivley

[57] ABSTRACT

A cable connector includes at least two electrically conductive slip ring members with freely rotatable contact surfaces which are mutually frictionally engaged with one another. Provision is made for selectively forcing the contact surfaces into highly pressurized engagement so as to lock them together during application of current through the cable. The present invention finds particular utility as a rotary joint cable connector for a pneumatically operated spot welding gun.

12 Claims, 4 Drawing Figures

CABLE CONNECTOR

DESCRIPTION

1. Technical Field

This invention relates to cable connectors, and more particularly, to rotary joint connectors for welding cables.

2. Background Art

There has been an increasing trend towards the use of robots to perform various operations in automated assembly lines. In one such operation robots are used to automatically position spot welding guns at preselected locations with respect to a workpiece where welds are desired to be carried out. The robot generally consists of a stationary platform with at least one movable arm extending from the platform. The spot welding gun is connected to the end of the arm by way of a wrist mechanism. Welding current is supplied to the spot welding gun by way of a welding cable connected at its opposite end to a power transformer. Since extremely high welding currents, often in the range of 25,000-30,000 amperes, are necessary to power the gun, specially constructed welding cables capable of carrying this amount of current are generally used. These so-called "kickless" welding cables are rather cumbersome devices and while they are generally of a sufficient length to move along the length of movement of the robot's arm, they resist any sort of twisting action which is often necessary when the gun is rotated by the wrist mechanism. Such twisting has a tendency to cause kinks in the cable which may damage the insulation in the cable and cause other damage which necessitates early replacement of the relatively expensive cables. Additionally, the range of robot motion often leads to the cable becoming entangled with the robot which also leads to breakage and other damage. This is particularly troublesome in connection with the use of automated robots where there is no human operator around which can make sure the cable does not become entangled.

The prior art teaches the use of rotatable cable connectors in other, diverse applications. Representative examples of rotatable cable connectors are disclosed in U.S. Pat. No. 4,210,373 to McGee and U.S. Pat. No. 2,790,152 to Mohr. Both of the patents disclose rotating cable connectors which purport to eliminate the problems associated with cable twisting. However, none of the prior art is particularly adapted for use in automated robotic assembly operations.

More importantly, the cable connectors of the prior art suffers from the inability to efficiently couple high current levels to such devices as spot welding guns over long periods of usage. It is, of course, imperative that sufficient current be coupled from the power transformer to the spot welding gun (or other electrically operated device) for proper operation. In many commonly used electrical conductors, oxides have a tendency to form on their surfaces after a period of time. These oxides act as insulators and degrade the current transfer capabilities of the connectors which use them. Thus, after an extended period of time, they must be discarded and replaced. Other cable connector designs having limited coupling contact areas (such as the ball bearings used in the Mohr patent) may not have sufficient current carrying capabilities in the first instance and may not be suitable for use in those applications using extremely high amperage current as noted above.

The present invention is directed to solving one or more of the problems noted above.

DISCLOSURE OF THE INVENTION

The apparatus of the present invention takes the form of a cable connector arrangement having at least two electrically conductive contact members with freely rotatable contact surfaces frictionally engaged together. Means are provided for selectively forcing the contact surfaces into highly pressurized engagement during application of current through the cable. One of the contact members is connected to a source of electrical power through the cable. The other contact member is connected to an electrically operated device powered by current supplied by the cable. In the preferred embodiment relative movement of the connector with respect to the cable causes a wiping action of the contact surfaces to keep them clean and prevent buildup of deleterious oxide formation. The contact surfaces are locked together during application of current through the cable to thereby provide increased coupling efficiency of the electrical power from the cable to the electrically operated device.

The present invention finds particular utility as a rotary joint cable connector for a pneumatically operated spot welding gun which is automatically positioned relative to a workpiece by a robot. In the preferred embodiment, a pair of conductive slip ring members have generally conical projections on opposing faces and are adapted to rotate together about a major axis. The cones of these members are nested into cup-shaped surfaces of an outer pair of slip rings which are also rotatable about a common axis. Preferably, at least one of the engaging surfaces of each pair includes grooves therein so that oxides and other debris created during the wiping action may be removed from the interface between the two current coupling engagement surfaces. A pneumatically operated piston adjacent one of the outer rings is operative for compressing the slip rings together during application of current to the cable. Conveniently, the piston may be simultaneously activated by the same source used to close the electrode jaws of the spot welding gun.

The inner and outer pair of slip rings each include lugs for connection to the welding cable and spot welding gun, respectively. In such manner, the inner and outer pair of slip rings may rotate freely to prevent twisting and kinking of the cable during movement of the robot actuated welding operations. More importantly, the current transfer capabilities of the present invention are exceptional and may be used in demanding high current applications over an extended period of time.

BRIEF DESCRIPTION OF THE DRAWINGS

These and other advantages of the present invention will become apparent after reading the following specification and by reference to the drawings in which.

DESCRIPTION OF THE PREFERRED EMBODIMENT

Figure 1:
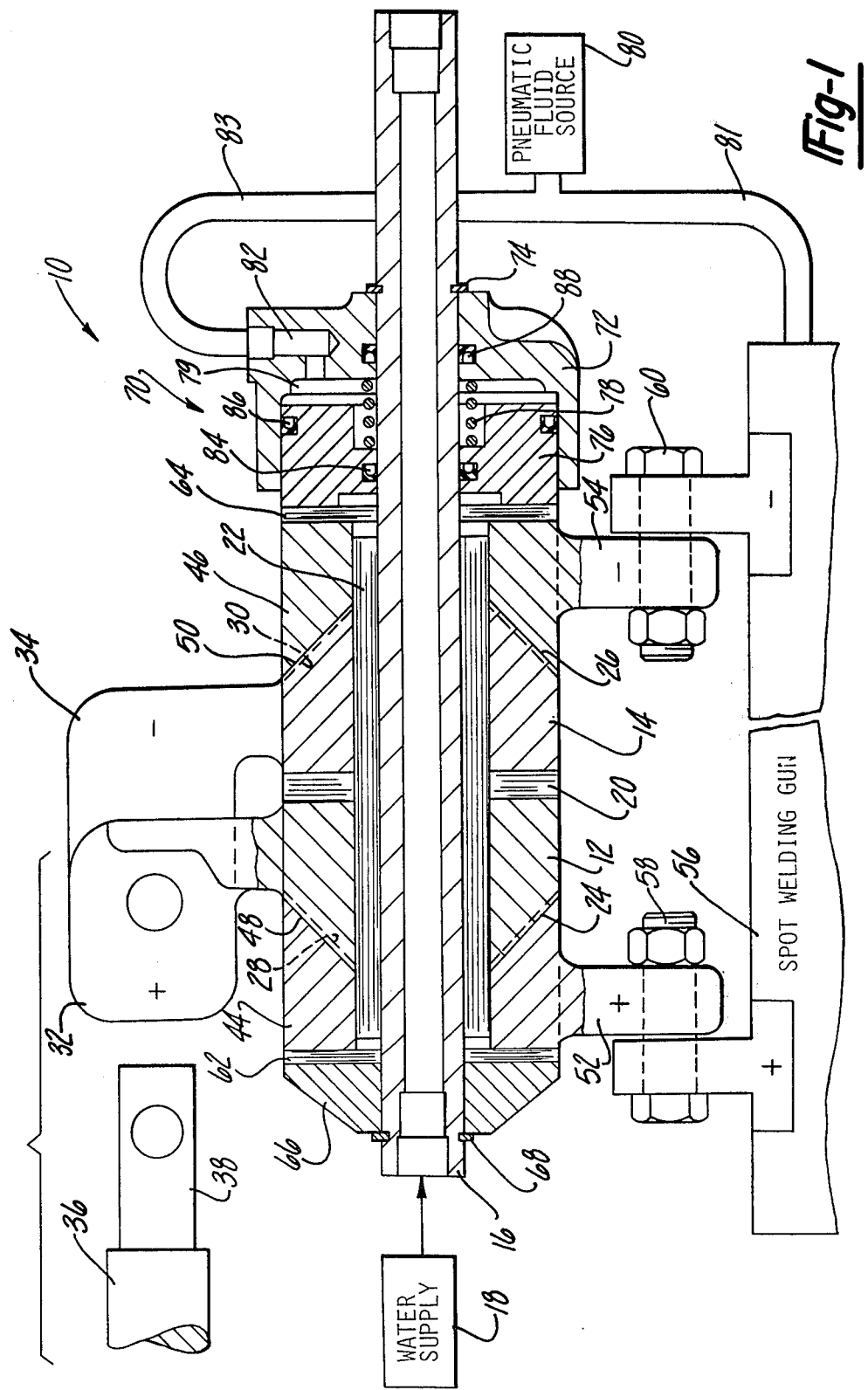
FIG. 1 is a partial cross sectional view of a preferred embodiment of the cable connector of the present invention.
Figure 2:
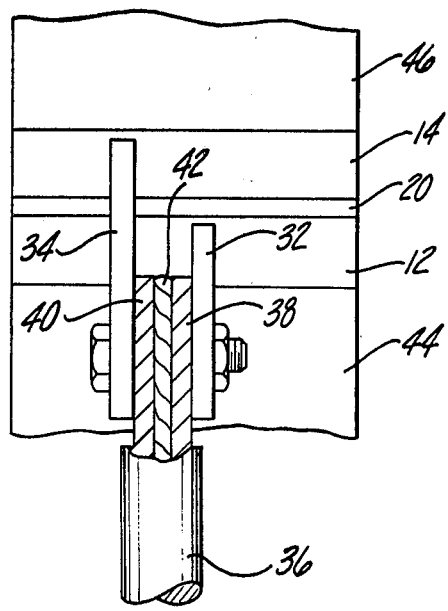
FIG. 2 is a partial top plan view of the cable connector of FIG. 1.

Referring now especially to FIGS. 1 and 2, a rotary joint cable connector 10 includes an inner pair of slip rings 12 and 14. Slip rings 12 and 14 are made of a suitable electrically conductive material such as copper. Slip rings 12 and 14 are rotatably mounted about a major longitudinal axis defined by shaft 16. In this embodiment, shaft 16 is a stainless steel conduit which may be connected to a recirculating water supply 18 to aid in removal of heat generated by connector 10.

Figure 3:
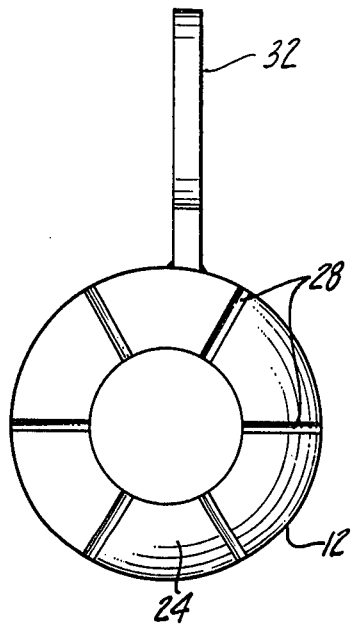
FIG. 3 is an end view of one of the slip ring contact members.

The inner surfaces of slip rings 12 and 14 are generally flat and are spaced from each other by an insulating ring 20 made, for example, of nylon. The inner circumferences of slip rings 12 and 14 are insulated from shaft 16 by way of nylon sleeve 22. The opposing outer most faces of slip rings 12 and 14 are cone-shaped thereby providing conically projecting contact surfaces 24 and 26, respectively. As can be seen most clearly in FIG. 3, the contact surfaces for slip rings 12 and 14 include a plurality of radially extending grooves 28 and 30 which extend from the inner most circumference to the outer periphery of slip rings 12 and 14, respectively. The purpose of grooves 28 and 30 will be discussed later herein.

Slip rings 12 and 14 include ear-shaped lugs 32 and 34, respectively. Lugs 32 and 34 provide clamping surfaces for connecting cable 36 to connector 10. As can be seen most clearly on FIG. 2, cable 36 includes terminal plates 38 and 40 for delivering current supplied by wound wires (not shown) in cable 36. Plates 38 and 40 are spaced by an insulating plate 42. A bolt 44 passing through openings in lugs 32, 34 and plates 38–42 serve to clamp cable 36 to connector 10 such that its major axis generally parallels the longitudinal axis of connector 10. Since terminal plates 38 and 40 are insulated from each other it can thus be seen that positive voltage may be applied from connector plate 38 to lug 32 and thence to slip ring 12. Similarly, negative voltage is supplied by connector plate 40 through lug 34 and thence to slip ring 14. Cable 36 is of a conventional design and is known in the trade as "kickless" welding cables. These cables, as mentioned above, are rigid and resist any torsional or twisting movement. Such cables can be purchased from a variety of sources such as Flex-Cable Corporation, 1875 Stephenson Hwy., Troy, Mich. 48084.

An outer pair of slip rings 44 and 46 are also rotatably mounted about shaft 16. Slip rings 44 and 46 include conical depressions or cup-shaped contacting surfaces 48 and 50, respectively. The cone-shaped contact surfaces 24 and 26 of inner slip rings 12 and 14 thus are nested in frictional engagement with the cup-shaped surfaces 48 and 50 of outer slip rings 44 and 46, respectively. Outer slip rings 44 and 46 are similarly made of an electrically conducted material such as copper and further include lugs 52 and 54, respectively. Lugs 52 and 54 can be used in a variety of manners to connect connector 10 to electrically operated machinery controlled by power delivered by cable 36. In the embodiment shown in FIG. 1, lugs 52 and 54 are shown as being mounted directly to the chassis of a spot welding gun 56 by bolts 58 and 60. Various alternative arrangements will become apparent to one skilled in the art. For example, only one of lugs 52 or 54 may be connected to gun 56 directly, with the other lugs being connected to a flexible cable which, in turn, is jumpered to another portion of the gun chassis. Alternatively, the entire connector 10 may be mounted to a bracket (not shown) and jumpers used from both lugs 52 and 54 to appropriate points on spot welding gun 56. In any event it can be seen that one current path is through inner ring 12 and thence through outer ring 44 where it passes out of lug 52. The other current conducting path is through slip ring 14 passing out of lug 54 through outer slip ring 46.

The current carrying slip rings are insulated from the remainder of cable connector 10 by way of insulating rings 62 and 64. An end cap 66 is secured to shaft 16 by way of snap ring 68 to hold the inner components longitudinally on shaft 16. Other means of accomplishing this function will become readily apparent. For example, end cap 66 may be threaded onto shaft 16.

Special attention should now be drawn to the pneumatically operated actuator device denoted generally by the reference numeral 70. Actuator 70 includes a cylinder cap 72 affixed longitudinally to shaft 16, for example, by way of snap ring 74. A piston 76 is mounted for reciprocating motion lengthwise about shaft 16 within the bore 79 of cylinder 72. The head of piston 76 is adapted to receive a spring 78 which continually urges piston 76 leftwardly to cause limited compressive forces between the slip ring components. The strength of spring 78 is chosen so as to be strong enough to maintain the contacting surfaces of the inner and outer slip ring pairs in wiping engagement. The strength of spring 78 is not so strong, however, to prevent rotational movement of the slip rings.

However, provision is made for selectively providing highly compressive forces to the slip rings when current is supplied over cable 36. This is provided by way of a pneumatic fluid source 80 which is connected to the cylinder bore 79 by way of inlet 82. When fluid from source 80 is supplied to cylinder bore 79, piston 76 is urged leftwardly to supply extremely high compressive forces to the slip rings to lock their respective contacting surfaces together. Ring seals 84, 86, and 88 serve to prevent leakage of the fluid in a manner known in the art.

Figure 4:
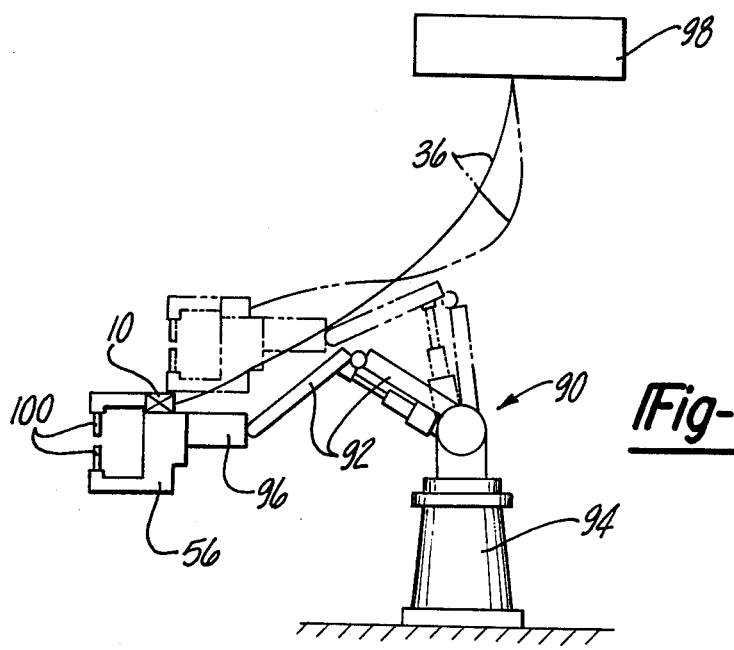
FIG. 4 is a view which schematically represents the use of the cable connector of the present invention in connection with a robot controlled spot welding gun.

FIG. 4 illustrates the use of connector 10 in a typical, but not limiting, application using a robot controlled spot welding gun 56. The positioning of welding gun 56 is performed automatically by way of robot 90 having pneumatically controlled arms 92 for moving gun 56 to and from base 94. A wrist mechanism 96 connects the spot welding gun 56 to the end of arms 92 and is operative to provide rotational movement to gun 56 with respect to robot base 94. Cable connector device 10 is mounted on gun 56 and cable 36, in turn, is mounted to it in the manner previously discussed. The opposite end of cable 36 is connected to a power transformer 98 which is capable of providing sufficient current to energize electrodes 100 of gun 56. Normally, the current is in excess of 10,000 amperes and, more particularly is in the range of 25,000–30,000 amperes. Since connector device 10 serves to couple the current from transformer 98 to electrodes 100 of gun 56, it, too, must be capable of withstanding this extremely high amount of current. A fluid source 80 (FIG. 1) is also connected to gun 56 to close electrodes 100 about the workpiece (not shown) during the welding operation. Fluid source 80 is shown in FIG. 1 as being connected to gun 56 by way of hose 81. Pursuant to a feature of this invention, the same fluid source 80 is used to simultaneously activate piston 76 when electrodes 100 of gun 56 are activated. This is shown schematically by hose 83 which is connected between cylinder inlet 82 and fluid source 80.

In operation, robot 90 actuates arms 92 to position gun 56 at the desired location. The length of cable 36 is such that it is free to follow the normally encountered transverse movement of arms 92. However, when gun 56 is rotated or twisted by the action of twist mechanism 96, cable 36 will resist such twisting motion. The torsional rigidity of cable 36 causes inner slip rings 12 and 14 of device 10 to rotate thereby preventing cable 36 from becoming kinked or otherwise entangled in the robot mechanisms. The rotation of the inner rings 12 and 14 cause their contact surfaces 24 and 26 to wipe against the opposing surfaces 48 and 50 of outer slip rings 44 and 46, respectively. This wiping contact tends to scrape the contacting surfaces keeping them clean and free from build up of damaging oxides which are particularly troublesome when copper members are subjected to extremely high current. The grooves 28 and 30 in the contacting surfaces of the inner slip rings provide passageways for removal of these oxides and other debris which may be created. The debris may pass through grooves 28 and 30 completely to the outer portion of connector 10. In any event, this debris is removed from the contacting areas of the slip ring surfaces.

When source 80 is activated to close electrodes 100 about the workpiece to perform the weld, the piston 76 is also actuated to lock the slip rings of connector 10 in intimate contact with each other. This highly pressurized contact increases the conductivity between the mating surfaces of the slip rings such that current which is then supplied from the transformer 96 is efficiently transferred to the electrodes 100. Additionally, the unique cup/cone nesting configuration of the slip rings serves to further increase the conductivity of cable connector 10. This cup/cone configuration increases the contact area between the abutting contact surfaces thereby increasing the current carrying capabilities of connector 10. Additionally, the wedge-like action of this configuration further increases the intimacy of the contact between these surfaces by facilitating an increased unit pressure between these surfaces.

When the welding operation is completed, cable 36 ceases supplying any more current and the pneumatic fluid source 80 is similarly deenergized. The gun 56 then may be moved to a different position to perform another operation. Since piston 76 is likewise deactuated, the slip rings are unlocked and returned to their wiping mode serving to prevent cable entaglement as previously noted.

It should be understood that while this invention finds particular utility in robot spot welding applications, one skilled in the art will appreciate that the concepts embodied in this invention will find a wide variety of other applications. The particular construction of connector 10 shown in the preferred embodiment may also take other forms. For example, device 10 may take a radial form or non-concentric axial configuration analogous to an automatic disk brake caliper. The actuator 70 instead of being pneumatic may alternatively be provided by way of a hydraulic source or controlled springs. Another possibility is the diversion of the coolant pressure from water supply 18 in a controlled manner.

If desired, silver grease may be used on the contact surfaces as a lubricant having good electrically conductive properties. In addition to the advantages noted above, the use of the present invention should reduce the length of the cable across the robot joint thereby making a more compact envelope. Shunt lengths should also be reduced in some applications and power loss is reduced by minimizing the size of the welding loop.

Other modifications of the present invention will become apparent to one skilled in the art upon a study of the drawings, specification and following claims.

We claim:

1. In a rotary joint cable connector, the improvement comprising:

at least two electrically conductive members having opposing contact surfaces normally held in wiping engagement with each other; and actuator means coupled to said members for selectively forcing the contact surfaces into highly pressurized locking engagement during application of current through the cable.

2. The improvement of claim 1 wherein said members are slip rings mounted for rotation about a common longitudinal axis.

3. The improvement of claim 2 wherein the contact surface of one of said slip rings is in the shape of a cone, with the contact surface of the other slip ring having a conical depression into which said cone is nested.

4. The improvement of claim 3 wherein at least one of said contacting surfaces includes radially extending grooves therein adapted to provide passageways for removal of matter from the wiping contact surfaces.

5. A rotary joint cable connector for a spot welding gun automatically positioned relative to a workpiece by a robot, said connector comprising:

first and second electrically conductive inner slip ring members insulated from each other and having generally conical projections on opposite end contact faces, said slip rings being adapted to rotate together about a major axis;

third and fourth outer electrically conductive slip ring members, each having conical depressions on inner contact faces thereof for receiving the conical projections of said first and second slip rings, respectively;

means for electrically connecting a welding cable to the outer periphery of said first and second slip ring members;

means for electrically connecting said third and fourth slip ring members to the spot welding gun;

means for normally holding the contact surfaces of the slip rings in wiping arrangement with each other; and actuator means for selectively compressing said slip ring members into mutually locked engagement when current is supplied to the spot welding gun by the cable.

6. The connector of claim 5 wherein said first, second, third and fourth slip rings are concentrically mounted about a conduit through which water may pass to remove heat from the connector.

7. The connector of claim 5 wherein said actuator means comprises:

a pneumatically operated piston.

8. The connector of claim 7 wherein said spot welding gun includes a pair of pneumatically operated electrodes, and wherein said spot welding gun and piston of the connector are simultaneously activated by a common fluid source.

9. The connector of claim 5 which further comprises:

a plurality of radially extending grooves on the contact face of at least one of said slip rings, adapted to provide passageways for removal of matter from the wiping contact surfaces.

10. The connector of claim 7 which further comprises:
spring means for maintaining the contact faces of said slip rings in wiping contact when the piston is not activated.

11. A rotary joint cable connector comprising:
a shaft;
a first inner electrically conductive slip ring member having a conically projecting contact surface;
a second inner electrically conductive slip ring member insulated from said first slip ring member, said second slip ring member having a conically projecting contact surface;
a third outer electrically conductive slip ring member having a contact surface with a conical depression into which said conically projecting contact surface of said first slip ring member nests;
a fourth outer electrically conductive slip ring member having a contact surface with a conical depression into which the conically projecting contact surface of said second slip ring member nests;
said first, second, third, and fourth slip ring members being mounted for rotational movement about said shaft;
said first and second slip ring members including lugs onto which a welding cable may be mounted such that the major longitudinal axis of an end portion of the cable is generally parallel with the shaft;
said third and fourth slip ring members including lugs for connecting to an external device to be powered by current supplied by the cable;
a concentrically mounted actuator mechanism on the shaft, said actuator mechanism including a cylinder with a reciprocating piston mounted within a bore therein, said piston having an end face for pressing against one of said outer slip ring members;
spring means for urging said piston against said slip ring members to bring the contact surfaces thereof into wiping engagement; and
means for connecting said cylinder bore to a pressure source for selectively activating said piston to further compress said slip ring members together and hold them in a locked relationship.

12. The connector of claim 11 wherein said shaft is hollow and adapted to pass recirculating liquid therethrough to remove heat from the connector.

* * * * *